US011092764B2

(12) United States Patent
Feng et al.

(10) Patent No.: US 11,092,764 B2
(45) Date of Patent: Aug. 17, 2021

(54) FLAME RETARDANT BUFFER TUBES FOR LOOSE TUBE CABLES

(71) Applicant: Corning Research & Development Corporation, Corning, NY (US)

(72) Inventors: Jie Feng, Berlin (DE); William Carl Hurley, Hickory, NC (US); Martina Petra Richter-Bühling, Neustadt bei Coburg (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/909,216

(22) Filed: Jun. 23, 2020

(65) Prior Publication Data

US 2021/0003797 A1    Jan. 7, 2021

Related U.S. Application Data

(60) Provisional application No. 62/869,937, filed on Jul. 2, 2019.

(51) Int. Cl.
*G02B 6/44* (2006.01)

(52) U.S. Cl.
CPC ......... *G02B 6/4436* (2013.01); *G02B 6/4434* (2013.01)

(58) Field of Classification Search
CPC .................................................. G02B 6/4436
See application file for complete search history.

(56) References Cited

U.S. PATENT DOCUMENTS 8,855,455 B2   10/2014   Keller et al.
9,690,062 B2   6/2017   Hurley et al.
(Continued)

FOREIGN PATENT DOCUMENTS

DE   102005052045 A1   5/2007
GB   2138168 A   10/1984
NO   2018/013396 A1   1/2018

OTHER PUBLICATIONS

European Patent Application No. 20183231.8 Partial European Search Report dated Nov. 18, 2020; 11 pages; European Patent Office.
(Continued)

*Primary Examiner* — Sung H Pak
*Assistant Examiner* — Hoang Q Tran
(74) *Attorney, Agent, or Firm* — William D. Doyle

(57) ABSTRACT

An optical fiber cable including a central strength member extending along a longitudinal axis of the optical fiber cable and a plurality of buffer tubes that are wound around the central strength member. Each of the plurality of buffer tubes includes a first material having a modulus of elasticity of at most 600 MPa at room temperature and a peak heat release rate (PHRR) of at most 300 kW/m$^2$ as measured according to ASTM E1354. Further, each of the plurality of buffer tubes has an inner surface that defines a central bore, and at least one optical fiber is disposed in each central bore in a loose-tube configuration. A cable jacket is disposed circumferentially around the plurality of buffer tubes and extends along the longitudinal axis. A laylength of the plurality of buffer tubes that are wound around the central strength member is from 200 mm to 400 mm.

20 Claims, 1 Drawing Sheet

(56) References Cited

U.S. PATENT DOCUMENTS

| | | |
|---|---|---|
| 10,120,152 B1 | 11/2018 | Evans |
| 2014/0226940 A1 | 8/2014 | Keller et al. |
| 2018/0059345 A1* | 3/2018 | Gallo .................. G02B 6/4436 |

OTHER PUBLICATIONS

Solutions to improve optical fiber cables flame retardancy, Proceedings of the 65th IWCS Conference, pp. 165-171.

* cited by examiner

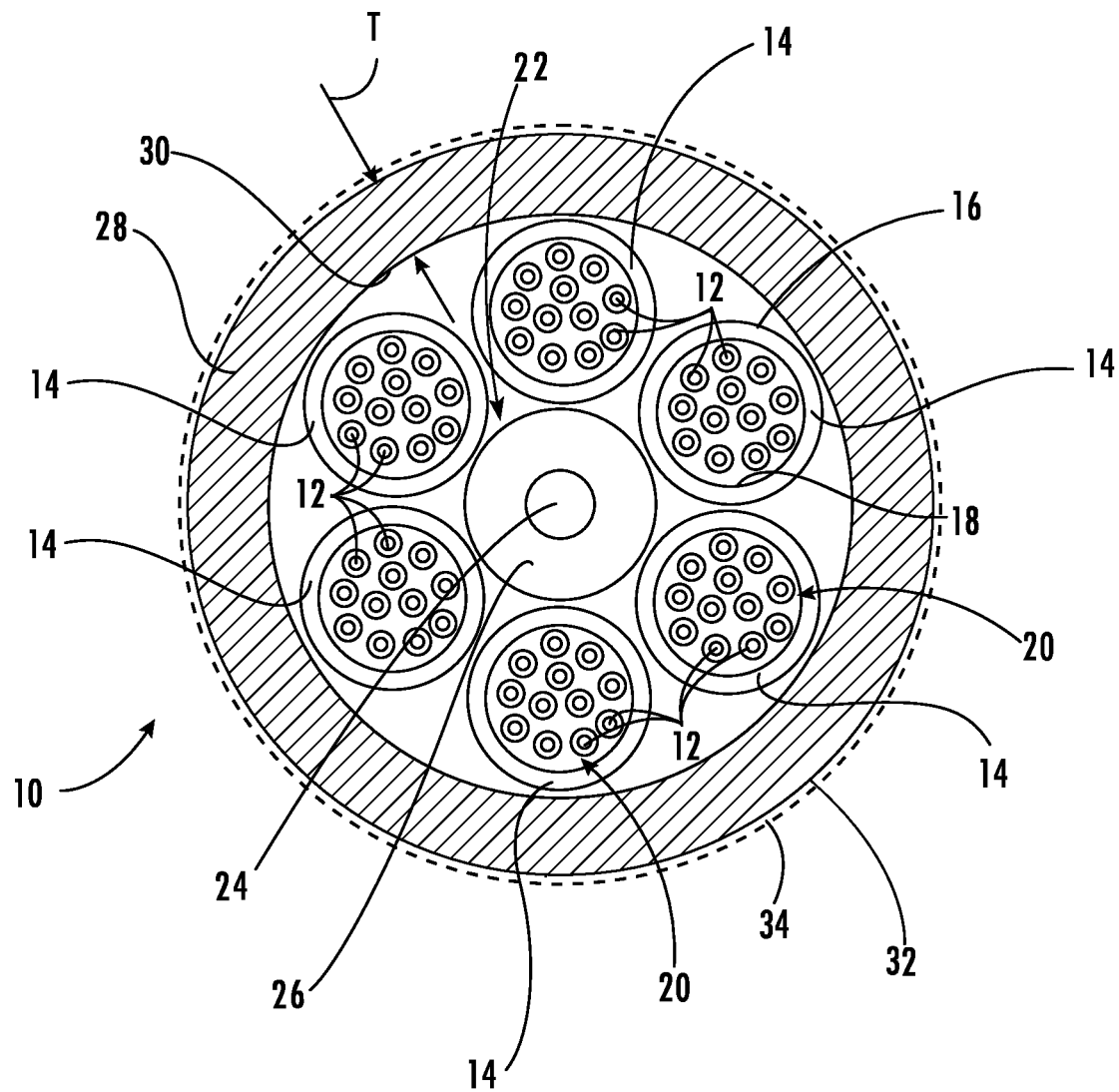

FLAME RETARDANT BUFFER TUBES FOR LOOSE TUBE CABLES

CROSS-REFERENCED TO RELATED APPLICATIONS

This application claims the benefit of priority under 35 U.S.C. § 119 of U.S. Provisional Application Ser. No. 62/869,937 filed on Jul. 2, 2019, the content of which is relied upon and incorporated herein by reference in its entirety.

BACKGROUND

The disclosure relates generally to a flame-retardant cable and more particularly to a cable in which the flame-retardant properties of individual components are enhanced in order to provide an overall highly flame-retardant cable. Flame-retardant materials are used to protect combustible materials, such as plastics or wood, from fire damage and heat. Additionally, flame-retardant materials have been used to protect materials, such as steel, that lose their strength when exposed to high temperatures. The way in which the flame-retardant materials are deployed may affect their flame-retardant properties as well as their mechanical properties.

SUMMARY

In one aspect, the present disclosure relates to an embodiment of an optical fiber cable. The optical fiber cable includes a central strength member extending along a longitudinal axis of the optical fiber cable. The optical fiber cable also includes a plurality of buffer tubes that are wound around the central strength member. Each of the plurality of buffer tubes includes a first material having a modulus of elasticity of at most 600 MPa at room temperature and a peak heat release rate (PHRR) of at most 300 kW/m$^2$ as measured according to ASTM E1354. Further, each of the plurality of buffer tubes has an inner surface that defines a central bore, and at least one optical fiber is disposed in each central bore in a loose-tube configuration. A cable jacket is disposed circumferentially around the plurality of buffer tubes and extends along the longitudinal axis. A laylength of the plurality of buffer tubes that are wound around the central strength member is from 200 mm to 400 mm.

In another aspect, the present disclosure relates to another embodiment of an optical fiber cable. The optical fiber cable includes a central strength member extending along a longitudinal axis of the optical fiber cable. The optical fiber cable also includes a plurality of buffer tubes that are wound around the central strength member. Each of the plurality of buffer tubes is made of a first material having a peak heat release rate (PHRR) of at most 300 kW/m$^2$ as measured according to ASTM E1354, and each of the plurality of buffer tubes has an inner surface that defines a central bore. At least one optical fiber is disposed within each central bore of the plurality of buffer tubes. A cable jacket is disposed circumferentially around the plurality of buffer tubes and extends along the longitudinal axis. The cable jacket is made of a second material having a PHRR of at most 300 kW/m$^2$. A laylength of the plurality of buffer tubes that are wound around the central strength member is from 200 mm to 400 mm.

In still another aspect, the present disclosure relate to still another embodiment of an optical fiber cable. The optical fiber cable includes a central strength member extending along a longitudinal axis of the optical fiber cable. The central strength member has a central rod and a coating disposed on the central rod. The coating is made of a first material having a peak heat release rate (PHRR) of at most 250 kW/m$^2$ as measured according to ASTM E1354. The optical fiber cable also includes a plurality of buffer tubes that are wound around the central strength member. Each of the plurality of buffer tubes is made of a second material having a PHRR of at most 300 kW/m$^2$. Each of the plurality of buffer tubes has an inner surface that defines a central bore containing at least one optical fiber. The optical fiber cable further includes a cable jacket disposed circumferentially around the plurality of buffer tubes and extending along the longitudinal axis. The cable jacket is made of a third material having a PHRR of at most 300 kW/m$^2$. The optical fiber cable has a B2$_{ca}$ rating according to EN 50399.

Additional features and advantages will be set forth in the detailed description that follows, and in part will be readily apparent to those skilled in the art from the description or recognized by practicing the embodiments as described in the written description and claims hereof, as well as the appended drawing.

It is to be understood that both the foregoing general description and the following detailed description are merely exemplary, and are intended to provide an overview or framework to understand the nature and character of the claims.

BRIEF DESCRIPTION OF THE DRAWING

The accompanying drawing is included to provide a further understanding and are incorporated in and constitute a part of this specification. The drawing illustrates one or more embodiment(s), and together with the description serves to explain principles and the operation of the various embodiments.

The FIG. 1 depicts an optical fiber cable having an outer jacket, buffer tubes containing optical fibers, and a central strength member all made from materials with optimized peak heat release rates, according to an exemplary embodiment.

DETAILED DESCRIPTION

Various embodiments of an optical fiber cable are provided that is configured to achieve a B2$_{ca}$ rating according to EN 50399. The cable achieves the rating through careful selection of the materials for the buffer tube, the cable jacket, and the coating of the central strength member (if provided). In particular, the materials are selected so as to limit the peak heat release during combustion, which reduces the overall intensity of combustion. In general, the materials selected for the buffer tube, cable jacket, and coating are highly filled with flame-retardant additives. Increasing the amount of flame-retardant additives in the materials used for these components has the effect of decreasing the elastic modulus for these components, and for this reason, Applicant understands the materials discussed herein are conventionally understood as unsuitable for optical fiber cable components. Notwithstanding this conventional understanding, Applicant found that, by increasing the laylength of the buffer tube winding around the central strength member, the impact of the lower elastic modulus was substantially reduced or eliminated. The embodiments of the optical fiber cable disclosed herein are provided by way of example and not by way of limitation.

FIG. 1 depicts an embodiment of an optical fiber cable 10 including a plurality of optical fibers 12 disposed within a plurality of buffer tubes 14. The buffer tubes 14 each include an exterior surface 16 and an interior surface 18. The interior surface 18 defines a bore 20 in which the optical fibers 12 are disposed. In the embodiment shown in the FIG. 1, the optical fibers 12 are arranged within the bore 20 in a loose tube configuration. Disposed within the bore 20 along with the optical fibers 12 may be a water-blocking material. In some embodiments, the water blocking material is a superabsorbent polymer (SAP) material, such as an SAP film or an SAP powder. Further, in some embodiments, the buffer tubes 14 do not contain any water blocking gels or oils, especially such gels or oils that tend to burn with great intensity.

According to the present disclosure, the buffer tubes 14 are made of a material that has a peak heat release rate (PHRR) of at most 300 kW/m$^2$. As used throughout the disclosure, when the PHRR is referenced, the PHRR was measured according to cone calorimetry (ASTM E1354/ISO 5660) using a sample having a size of 100 mm wide×100 mm long×3 mm thick. Further, in the cone calorimetry testing referenced herein, a heat source radiates heat on the sample at an intensity at or near 50 kW/m$^2$. In other embodiments, the buffer tubes 14 are made of a material that has a PHRR of at most 200 kW/m$^2$. Additionally, the buffer tube material comprises an elastic modulus of from 100 MPa to 600 MPa. For example, the elastic modulus of the buffer tube material is no more than 600 MPa at room temperature. In some embodiments, the elastic modulus of the buffer tube material is at least 100 MPa. As will be discussed below, the elastic modulus is indicative of a buffer tube material that is highly-filled with flame-retardant additives, and maintaining the elastic modulus in this range provides suitable balance between mechanical properties and flame-retardant performance. Further, in some embodiments, the optical fiber cable 10 may include filler tubes or rods in place of buffer tubes 14, i.e., where the filler tube is needed just to fill space (e.g., to provide a round outer circumference of the cable 10) and not to carry optical fibers 12. In embodiments that include such filler tubes, the filler tube material also has a PHRR of at most 300 kW/m$^2$, more particularly at most 200 kW/m$^2$.

In one embodiment, the buffer tube material and/or the filler tube material comprises, for example, a polycarbonate (PC) and polybutylene terephthalate (PBT) with one or more flame-retardant additives. In another embodiment, the buffer tube material and/or filler tube material comprises polyethylene (PE) and ethylene vinyl acetate (EVA) along with one or more flame-retardant additives. Other polymers suitable for use in the buffer tube material and/or filler tube material include polypropylenes, polyesters, copolyesters, methyl vinyl acetates, and polyethylenes, among others. Exemplary flame-retardant additives include aluminum trihydrate (ATH), magnesium hydroxide (MDH), ammonium polyphosphate (APP), pentaerythritol (PER), antimony oxides, zinc borates, boehmite, intumescent materials, and red phosphorous, among others. ATH and MDH, in particular, operate as flame-retardant additives by endothermically decomposing between about 200° C. and about 300° C. to release water. The endothermic reaction absorbs heat, and the release of water helps put out flames and cool the temperature of the fire. Additionally, the ATH and MDH can promote char formation, which helps remove potential fuel from the combustion reaction.

In embodiments, the buffer tube material and/or filler tube material comprises at least 30% by weight of the one or more flame-retardant additives. In other embodiments, the buffer tube material and/or filler tube material comprises at least 40% by weight of the one or more flame-retardant additives, and in still other embodiments, the buffer tube material and/or filler tube material comprises at least 50% by weight of the one or more flame-retardant additives.

Commercially available flame-retardant materials for the buffer tubes and/or filler tubes include CONGuard® 566505 and 566155 (manufactured by Condor Compounds GmbH, Braunschweig), ECCOH™ 5509 (manufactured by PolyOne Corporation, Avon Lake, Ohio), MEGOLON® HF 8142 UV-FG and HF 8553 (manufactured by Mexichem, Tlalnepantla, Mexico), HF 425 MD (manufactured by Fainplast srl, Ascoli Piceno, Italy), Mecoline S TP 1030F manufactured by Melos GmbH, Melle, Germany), Cogegum® 09/1/79 (manufactured by Solvay S. A., Brussels, Belgium), and Halguard® 58140 (manufactured by Teknor Apex, Pawtucket, R.I.). These flame-retardant materials are provided by way of example only and should not be considered limiting as to the range of suitable flame-retardant materials for the buffer tubes and/or filler tubes In embodiments, the buffer tubes 14 are stranded around a central strength member 22. Depending on the size of the buffer tubes 14, the central strength member 22 may include a central rod 24 and a coating 26 over the central rod 24 to provide a desired diameter of the central strength member 22. In this way, the buffer tubes 14 are in contact with an outer surface of the coating 26 and in close proximity to or in contact with each other, as shown in the FIG. 1. In embodiments, the coating 26 is made from a material having a PHRR of no more than 250 kW/m$^2$. Exemplary materials for use as the coating 26 include the polymers and flame-retardants listed above (as well as their proportions and commercially available examples) for the buffer tubes/filler rods. In embodiments, the central rod 24 is a glass-reinforced plastic rod or a metal wire, for example.

As shown in FIG. 1, the buffer tubes 14 are wound around the central strength member in a helical or SZ winding pattern. The period of the winding pattern is referred to as the laylength. More specifically, the laylength of the buffer tubes 14 refers to length of cable over which the strand completes one complete revolution of the cable circumference. Applicant has found that the materials necessary to achieve the desired flame-retardant performance tend to have lower mechanical strength than the same materials without the flame-retardant additives. That is, the level of loading of flame-retardant material into the polymer compositions degrades the mechanical robustness of the material. Thus, if the buffer tubes 14 according to the present disclosure were wound around the central strength member 22 at conventional laylengths, the buffer tubes 14 could be crushed against the central strength member 22.

Conventionally, the laylength of a buffer tube having a loose tube configuration in an optical fiber cable is from 80 mm to 110 mm. However, according to embodiments of the present disclosure, the laylength of the buffer tubes 14 is from 200 mm to 400 mm. Thus, the laylength of the buffer tubes 14 in the optical fiber cable 10 according to the present disclosure is almost twice that of the laylength for a buffer tube in a conventional cable. In this way, the optical fiber cable 10 can include a flame-retardant buffer tube 14 and avoid being crushed against the central strength member 22 when the buffer tube 14 is wound around the central strength member 22. In embodiments, the buffer tubes 14 may be wrapped in a water-blocking tape and/or a tensile elements, such as glass or aramid strands.

Disposed around the buffer tubes 14 (and any wraps or tensile elements) is a cable jacket 28. In embodiments, the cable jacket 28 surrounds the buffer tubes 14 in the circumferential direction and is a continuous and contiguous along the length of the cable 10. The cable jacket 28 has an inner surface 30 and an outer surface 32 defining a thickness T therebetween. In embodiments, the thickness T is at most 3 mm, in particular at most 2.5 mm.

According to the present disclosure, the cable jacket 28 is comprised of a material having a PHRR of no more than 300 kW/m², more particularly no more than 200 kW/m². In embodiments, the cable jacket 28 comprises a low smoke, zero halogen (LSZH) or flame-retardant, non-corrosive (FRNC) composition. In certain embodiments, the cable jacket 28 is comprised of a flame-retardant additive dispersed, mixed, or otherwise distributed in a polymeric resin. In embodiments, the polymeric resin is a thermoplastic, and in a more specific embodiment, the thermoplastic is a polyolefin-based resin. Polymer resins that may be used for the cable jacket 28 include a single polymer or a blend of polymers selected from the following non-limiting list: ethylene-vinyl acetate copolymers, ethylene-acrylate copolymers, ethylene homopolymers (including but not limited to low density, medium density, and high density), linear low density polyethylene, very low density polyethylene, polyolefin elastomer copolymer, propylene homopolymer, polyethylene-polypropylene copolymer, butene- and octene branched copolymers, polyester copolymers, polyethylene terephthalates, polybutylene therephthalates, other polymeric terephthalates, and maleic anhydride-grafted versions of the polymers listed herein.

As mentioned herein, the cable jacket 28 includes at least one flame-retardant additive. Exemplary flame-retardant additives include aluminum trihydrate (ATH), magnesium hydroxide (MDH), ammonium polyphosphate (APP), pentaerythritol (PER), antimony oxides, zinc borates, boehmite, intumescent materials, and red phosphorous, among others. In embodiments, the flame-retardant additive comprises from 30 wt % to 65 wt % of the composition of the cable jacket 28. In other embodiments, the flame-retardant additive comprises from 40 wt % to 60 wt % of the composition of the cable jacket 28. In a more specific embodiment, the flame-retardant additive comprises from 45 wt % to 55 wt % of the composition of the cable jacket 28.

The cable jacket 28 may also include non-flame-retardant additives typically used in polymer processing, such as mineral fillers (talc, calcium carbonate, etc.), carbon black, antioxidants, UV additives, processing modifiers, compatibilizers, and/or other standard polymer additives.

Additionally, the optical fiber cable 10 may include one or more access features, such as strips of dissimilar polymer (e.g., a strip of polypropylene in a polyethylene cable jacket 28) or a ripcord (not shown). Such access features allow for access to the interior components of the cable, e.g., to the buffer tubes 14 and the optical fibers 12 therein. Further, in embodiments, the cable jacket 28 may include a coating 34 that facilitates installation of the optical fiber cable 10. In the FIG. 1, the coating 34 is shown in dashed line in view of its optional nature. For example, the cable jacket 28 may be provided with a hard coating of a polymer having an elastic modulus of more than 900 MPa, such as high density polyethylene or a polyamide. In embodiments, the coating has a thickness of at most 0.05 mm in order to facilitate blowing of the cable through a duct.

In general, an optical fiber cable 10 constructed as described above exhibits enhanced performance in terms of PHRR, total heat release (THR), and flame spread (FS) as measured according to EN 50399. THR relates to the energy released during combustion of the optical fiber cable 10, and PHRR relates to the power or intensity of the heat released from the burning cables. Embodiments of the optical fiber cable 10 as disclosed herein are classified as Class $B2_{ca}$ according to the EN 50399 reaction to fire test, which is the highest rating for optical cables. To achieve a rating of $B2_{ca}$, the optical fiber cable test sample must have a FS of at most 1.5 m, a PHRR of at most 30 kW, and a THR of at most 15 MJ. According to the present disclosure, the $B2_{ca}$ rating is achieved through material selection of the cable jacket, buffer tube, and central strength member coating (if present) to be limited with respect to their individual PHRR. This limits the overall PHRR as well as the THR, and the lower PHRR also reduces the intensity available to drive combustion and flame spread. However, the increased flame retardancy performance is accompanied by a decrease in mechanical properties, which could lead to crushing of the buffer tubes but for Applicant's adjustment of the laylength of the buffer tubes wound around the central strength member. Accordingly, embodiments of a flame-retardant cable with suitable mechanical robustness to withstand the rigors of installation are disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. For example, a cable could be provided with a single buffer tube comprised of the materials and with the properties outlined in this specification. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   a central strength member extending along a longitudinal axis of the optical fiber cable;
   a plurality of buffer tubes that are wound around the central strength member, wherein each of the plurality of buffer tubes comprises a first material having a modulus of elasticity of at most 600 MPa at room temperature and a peak heat release rate (PHRR) of at most 300 kW/m² as measured according to ASTM E1354, wherein each of the plurality of buffer tubes comprises an inner surface that defines a central bore, and wherein at least one optical fiber is disposed in each central bore in a loose-tube configuration; and
   a cable jacket disposed circumferentially around the plurality of buffer tubes and extending along the longitudinal axis;
   wherein a laylength of the plurality of buffer tubes that are wound around the central strength member is from 200 mm to 400 mm.

2. The optical fiber cable of claim 1, wherein the cable jacket comprises a second material having a PHRR of at most 300 kW/m².

3. The optical fiber cable of claim 2, wherein the cable jacket comprises an interior surface and an exterior surface, the interior surface and exterior surface defining a thickness therebetween, wherein the thickness is at most 3 mm.

4. The optical fiber cable of claim 2, wherein the first material and the second material each have a PHRR of at most 200 kW/m$^2$.

5. The optical fiber cable of claim 1, wherein the central strength member comprises a central rod having a coating and wherein the coating comprises a third material having a PHRR of at most 250 kW/m$^2$.

6. The optical fiber cable of claim 1, wherein the plurality of buffer tubes do not comprise any water-blocking gels or oils.

7. The optical fiber cable of claim 6, further comprising a superabsorbent polymer material disposed on the inner surface or in the central bore of each of the plurality of buffer tubes or both on the inner surface and in the central bore of each of the plurality of buffer tubes.

8. The optical fiber cable of claim 1, further comprising a coating of a polymer material with a modulus of elasticity of at least 900 MPa disposed circumferentially around the cable jacket and extending along the longitudinal axis, wherein the coating has a thickness of at most 0.05 mm.

9. The optical fiber cable of claim 1, wherein the optical fiber cable is rated B2$_{ca}$ according to EN 50399.

10. The optical fiber cable of claim 1, wherein the PHRR is determined according to ASTM E1354 using a sample having a width of 100 mm, a length of 100 mm, and a thickness of 3 mm and a heat source that radiates heat on the sample at an intensity of 50 kW/m$^2$.

11. An optical fiber cable, comprising:
a central strength member extending along a longitudinal axis of the optical fiber cable;
a plurality of buffer tubes that are wound around the central strength member, wherein each of the plurality of buffer tubes comprises a first material having a peak heat release rate (PHRR) of at most 300 kW/m$^2$ as measured according to ASTM E1354, wherein each of the plurality of buffer tubes comprises an inner surface that defines a central bore;
at least one optical fiber disposed within each central bore of the plurality of buffer tubes;
a cable jacket disposed circumferentially around the plurality of buffer tubes and extending along the longitudinal axis, the cable jacket comprising a second material having a PHRR of at most 300 kW/m$^2$;
wherein a laylength of the plurality of buffer tubes that are wound around the central strength member is from 200 mm to 400 mm.

12. The optical fiber cable of claim 11, wherein the first material has a modulus of elasticity of at most 600 MPa at room temperature.

13. The optical fiber cable of claim 12, wherein the first material comprises at least 45% by weight of at least one flame-retardant additive selected from the group consisting of aluminum trihydrate, magnesium hydroxide, ammonium polyphosphate, pentaerythritol, antimony oxides, zinc borates, boehmite, intumescent materials, and red phosphorous.

14. The optical fiber cable of claim 13, wherein the first material further comprises at least one polymer selected from the group consisting of polycarbonate, polybutylene terephthalate, polyethylene, ethylene vinyl acetate, methyl vinyl acetate, polyethylene, polypropylene, polyester, and copolyester.

15. The optical fiber cable of claim 11, wherein the central strength member comprises a central rod having a coating and wherein the coating comprises a third material having a PHRR of at most 250 kW/m$^2$.

16. The optical fiber cable of claim 11, further comprising a coating of a polymer material having a modulus of more than 900 MPa disposed circumferentially around the cable jacket and extending along the longitudinal axis, wherein the coating has a thickness of at most 0.05 mm.

17. The optical fiber cable of claim 11, wherein the first material and the second material each have a PHRR of at most 200 kW/m$^2$.

18. The optical fiber cable of claim 11, wherein the optical fiber cable is rated B2$_{ca}$ according to EN 50399.

19. The optical fiber cable of claim 11, further comprising at least one filler tube or rod that does not contain any optical fibers, wherein the filler tube or rod comprises a third material having a PHRR of less than 300 kW/m$^2$.

20. The optical fiber cable of claim 11, wherein the second material is a low-smoke, zero-halogen material.

\* \* \* \* \*